United States Patent
Kroemer et al.

(10) Patent No.: US 10,890,470 B2
(45) Date of Patent: Jan. 12, 2021

(54) ULTRASONIC FLUID METER AND METHOD FOR DETERMINING THE FLOW RATE AND/OR VOLUME OF A FLOWING MEDIUM

(71) Applicant: DIEHL METERING GMBH, Ansbach (DE)

(72) Inventors: Harald Kroemer, Ansbach (DE); Wilhelm Oefelein, Ansbach (DE); Malte Baer, Nuremberg (DE)

(73) Assignee: Diehl Metering GmbH, Ansbach (DE)

(*) Notice: Subject to any disclaimer, the term of this patent is extended or adjusted under 35 U.S.C. 154(b) by 238 days.

(21) Appl. No.: 16/032,587

(22) Filed: Jul. 11, 2018

(65) Prior Publication Data

US 2018/0321067 A1   Nov. 8, 2018

Related U.S. Application Data

(63) Continuation of application No. PCT/EP2016/002110, filed on Dec. 15, 2016.

(30) Foreign Application Priority Data

Jan. 14, 2016   (DE) .................. 10 2016 000 267
May 20, 2016   (DE) .................. 10 2016 006 244

(51) Int. Cl.
    *G01F 1/66*   (2006.01)
(52) U.S. Cl.
    CPC ............. *G01F 1/662* (2013.01); *G01F 1/667* (2013.01)
(58) Field of Classification Search
    CPC .................... G01F 1/662; G01F 1/667

USPC ........................................... 73/861.72
See application file for complete search history.

(56) References Cited

U.S. PATENT DOCUMENTS

| | | |
|---|---|---|
| 5,546,813 A | 8/1996 | Hastings et al. |
| 7,735,380 B2 | 6/2010 | Groeschel et al. |
| 2007/0220995 A1* | 9/2007 | Kishiro ............... G01F 1/662 73/861.28 |
| 2008/0098824 A1* | 5/2008 | Bailey ............... G01F 1/666 73/861.27 |
| 2010/0199088 A1 | 8/2010 | Nath et al. |
| 2013/0239698 A1 | 9/2013 | Aughton et al. |
| 2015/0355001 A1* | 12/2015 | Dabak ............... G01F 1/667 702/48 |
| 2016/0327419 A1* | 11/2016 | Hellevang ............ G01F 1/66 |

FOREIGN PATENT DOCUMENTS

| | | |
|---|---|---|
| CN | 1926407 A | 3/2007 |
| EP | 2310808 B1 | 5/2013 |

* cited by examiner

*Primary Examiner* — Tarun Sinha
(74) *Attorney, Agent, or Firm* — Laurence A. Greenberg; Werner H. Sterner; Ralph E. Locher

(57) ABSTRACT

An ultrasonic fluid meter for determining the flow rate and/or volume of a flowing medium includes a housing, an inlet, an outlet, a first ultrasound measurement path including at least one ultrasound transducer, and a second ultrasound measurement path including at least one ultrasound transducer. The ultrasound measurement paths extend at an angle to one another inside the housing and intersect. The first ultrasound measurement path and the second ultrasound measurement path extend at an angle to one another and intersect in a common region, as seen in a projection plane of a flow cross section. A method for determining the flow rate and/or volume of a flowing medium is also provided.

13 Claims, 14 Drawing Sheets

ULTRASONIC FLUID METER AND METHOD FOR DETERMINING THE FLOW RATE AND/OR VOLUME OF A FLOWING MEDIUM

CROSS-REFERENCE TO RELATED APPLICATION

This application is a continuation, under 35 U.S.C. § 120, of copending International Application PCT/EP2016/002110, filed Dec. 15, 2016, which designated the United States; this application also claims the priority, under 35 U.S.C. § 119, of German Patent Applications DE 10 2016 000 267.0, filed Jan. 14, 2016 and DE 10 2016 006 244.4, filed May 20, 2016; the prior applications are herewith incorporated by reference in their entirety.

BACKGROUND OF THE INVENTION

Field of the Invention

The present invention relates to an ultrasonic fluid meter for determining the flow rate and/or volume of a flowing medium. The ultrasonic fluid meter includes a housing, an inlet, an outlet, a first ultrasound measurement path including at least one ultrasound transducer, and a second ultrasound measurement path including at least one ultrasound transducer, wherein the ultrasound measurement paths are disposed in such a way as to extend at an angle relative to one another inside the housing and to intersect. The present invention also relates to a method for determining the flow rate and/or volume of a flowing medium.

Ultrasonic fluid meters are conventionally used to determine quantities of fluid consumed in a fluid supply network. Ultrasonic fluid meters are generally used to determine the flow rate, volume or heat quantity of fluids, for example water.

The most common application field of ultrasonic fluid meters involves water meters for determining drinking water consumption in buildings and households, or heat quantity meters for determining the heat energy consumed. Such ultrasonic fluid meters generally have a housing with an inlet and an outlet. Through the use of the housing, the ultrasonic fluid meter can be installed in a fluid line network, for example a drinking water supply. The flow direction of the fluid inside the ultrasonic fluid meter may be unchanged from the inlet to the outlet, or may also vary depending on the structure of the ultrasonic fluid meter.

The functionality of an ultrasonic fluid meter is based on the use of ultrasound transducers, in particular piezoelectric-based ultrasound transducers, which are fitted in the region of the housing of the ultrasonic fluid meter. In that case, two ultrasound transducers always form an ultrasound transducer pair, there being an ultrasound measurement path between the two ultrasound transducers of the ultrasound transducer pair. Ultrasound signals, so-called ultrasound bursts, can be emitted and received by the ultrasound transducers along the ultrasound measurement path. The ultrasound measurement path may in that case have a very wide variety of shapes. For example, it may be rectilinear, curved, U-shaped, or, because of multiple deviations, linearly zigzagged. The sound propagation generated by the ultrasound transducers is distributed over spatially divided sound lobes of different intensity. Besides an axial primary sound lobe, unavoidable side sound lobes specific to the ultrasound transducer may be formed.

The determination of the flow rate and/or volume of a flowing medium by using an ultrasound transducer is carried out with the aid of a time-of-flight difference measurement of the ultrasound signals. The time-of-flight difference is determined by first emitting an ultrasound signal from a first ultrasound transducer of the ultrasound transducer pair to a second ultrasound transducer of the ultrasound transducer pair in the flow direction along the ultrasound measurement path. Subsequently, an ultrasound signal is emitted from the second ultrasound transducer opposite to the flow direction along the ultrasound measurement path to the first ultrasound transducer. The transmission of the ultrasound signal from one ultrasound transducer to the other ultrasound transducer along the ultrasound measurement path takes place more rapidly in the flow direction of the medium than counter to the flow direction of the medium. This time difference of the transmission duration of the two ultrasound signals is referred to as a time-of-flight discrepancy or time-of-flight difference of the ultrasound signals. With the aid of this time-of-flight discrepancy and the already known dimension of the ultrasonic fluid meter, or of the ultrasound measurement path, it is possible to determine the flow rate or alternatively the volume of the medium flowing through.

Ultrasonic fluid meters which use the measurement principle of diagonal sound transmission with two or more ultrasound measurement paths are also advantageously used. Average values may be formed from the measurement values of the individual ultrasound measurement paths, in order to achieve a more accurate measurement result. Generally, in the case of a plurality of ultrasound measurement paths, the ultrasound transducers are fitted parallel or mirror-symmetrically into the housing of the ultrasonic fluid meter, so that ultrasound measurement paths extending parallel are formed. That leads to structural advantages since, for example, the cable routing or the housing processing can be implemented simply. In terms of measurement technology, however, various problems may arise in terms of the ultrasound acoustics and the flow guidance, for example non-measurement of the maximum flow rate at the center of the flow, less accurate averaging of the ultrasound signals and/or acoustic crosstalk of the parallel ultrasound measurement paths or the ultrasound signals of the ultrasound transducer pairs.

European Patent EP 2 310 808 B1, corresponding to U.S. Pat. No. 7,735,380, describes a method for coordinating a measuring system of an ultrasonic flow meter. The ultrasonic flow meter has a plurality of ultrasound transducer pairs with associated ultrasound measurement paths. The ultrasound transducers are disposed inside larger recesses. The ultrasound measurement paths are fitted in an X-shape in the housing of the ultrasonic flow meter, as seen from the upper side of the ultrasonic flow meter, so that a plurality of parallel ultrasound measurement paths are disposed as seen in the projection plane of the flow cross section. Due to such a structure, non-measurement of the maximum flow rate at the center of the flow, or of the housing, may occur since, depending on the geometry and configuration of the ultrasound transducers, there are always regions at the center of the flow which do not lie inside one of the ultrasound measurement paths and are therefore not recorded. That results in inaccurate averaging, particularly in the case of a change between laminar and turbulent flow of the medium. Furthermore, acoustic crosstalk of the individual ultrasound transducers is very likely because of the ultrasound measurement paths positioned close to one another. As a result of acoustic crosstalk, on one hand the reception amplitude is cut down, and on the other hand a resulting phase shift of the added individual signals may cause measurement errors in the time-of-flight difference. Another disadvantage of that invention resides in the weighting of the individual ultrasound measurement paths. Due to flow differences, the ultrasound measurement paths must be weighted to a greater or lesser extent in the course of the subsequent flow rate calculation, depending on how far the respective ultrasound measurement path is away from the cross-sectional middle of the housing. In that case, different characteristic curves must be compiled for the individual ultrasound measurement paths, in order to be able to determine an exact flow rate. As a result thereof, the flow rate calculation becomes difficult and susceptible to error. Furthermore, turbulences as well as air bubble formation and cavitation, which negatively influence the measurement result, may occur because of the sizeable recesses. In addition, there is an expensive structural disadvantage due to the use of a multiplicity of ultrasound transducers.

SUMMARY OF THE INVENTION

It is accordingly an object of the invention to provide an ultrasonic fluid meter and a method for determining the flow rate and/or volume of a flowing medium, which overcome the hereinafore-mentioned disadvantages of the heretofore-known meters and methods of this general type and with which a more accurate measurement result can be achieved with a simplified structure and reduced costs.

With the foregoing and other objects in view there is provided, in accordance with the invention, an ultrasonic fluid meter for determining the flow rate and/or volume of a flowing medium. The ultrasonic fluid meter includes a housing, an inlet, an outlet, a first ultrasound measurement path including at least one ultrasound transducer, and a second ultrasound measurement path including at least one ultrasound transducer. The ultrasound measurement paths are disposed so as to extend at an angle relative to one another inside the housing and to intersect. The first ultrasound measurement path and the second ultrasound measurement path are disposed in such a way as to extend at an angle relative to one another and to intersect in a common region M, as seen in the projection plane of the flow cross section.

According to the invention, in the ultrasonic fluid meter of the species for determining the flow rate and/or volume of a flowing medium, or of a fluid, the first ultrasound measurement path and the second ultrasound measurement path, respectively as seen in the projection plane of the flow cross section, are disposed so as to extend at an angle to one another and intersect in a common region. This leads to the advantage that the risk of acoustic crosstalk of the two ultrasound measurement paths is minimized, and therefore the measurement accuracy, particularly in the case of perturbed flow profiles, is increased significantly. Furthermore, when there are two measurement paths, an increased measurement region inside the cross section of the ultrasonic fluid meter is provided, so that weighting of the ultrasound measurement paths over the flow cross section of the ultrasonic fluid meter is unnecessary. In this way, the calculation of the measurement results of the ultrasound measurement paths is simplified to a considerable extent.

Expediently, the entire region, respectively as seen in the projection plane of the flow cross section, lies in the region of the mid-axis of the housing of the ultrasonic fluid meter, so that center-weighted measurement of the cross section of the housing is carried out. In this way, a crossover or skew configuration of the ultrasound measurement paths inside the ultrasonic fluid meter may be produced. By using center-weighted measurement, the measurement accuracy can be additionally improved since the greatest flow rate prevails inside the central region of the housing, particularly in the case of unperturbed flow profiles.

Preferably, the entire region lies in the region of the mid-axis of the housing. In this case, the ultrasound measurement paths intersect in the region of the housing center of the ultrasonic fluid meter. The measurement accuracy is increased even further by this feature.

Furthermore, the first ultrasound measurement path and the second ultrasound measurement path may extend obliquely or diagonally with respect to the mid-axis of the housing, or the flow direction of the medium. In this case, for example, the ultrasound transducers of an ultrasound transducer pair may be disposed diagonally opposite along the flow direction, or the flux direction of the medium. In this way, a larger measurement region can be covered in the cross section of the ultrasonic fluid meter. Furthermore, a measurement profile is placed through the cross section of the housing of the ultrasonic fluid meter, this profile extending from one wall of the housing through the middle of the cross section to the opposite wall of the housing. The measurement accuracy is additionally increased by this feature, since even perturbed flow profiles or flow profile shifts can be recorded reliably. Furthermore, even relatively large flow profile shifts only have a moderate effect on the averaged measurement result. In addition, due to the angled configuration of the ultrasound measurement paths, or of the ultrasound transducers, a larger measurement region of the cross section of the ultrasonic fluid meter can be covered with only a few ultrasound transducers, or ultrasound measurement paths. In this way, the production costs can be reduced to a considerable extent as compared with the prior art.

Preferably, the first and second ultrasound measurement paths, as seen in a projection plane lying transversely with respect to the mid-axis of the housing, extend at an angle to one another. In this way, crosstalk of the ultrasound signals of the ultrasound measurement paths is prevented. This configuration of the ultrasound measurement paths may, for example, be produced by specific positioning of the ultrasound transducers, or of the ultrasound transducer pairs, on the housing of the ultrasonic fluid meter or by the use of reflectors, or mirrors.

Preferably, the first and second ultrasound measurement paths extend at a right angle (orthogonally) to one another. This may, for example, be achieved by an offset of the ultrasound transducers by 90° along the circumference of the housing. In this way, a maximally large measurement region is covered with four ultrasound transducers.

As an alternative, embodiments having a plurality of ultrasound measurement paths and associated ultrasound transducers, or ultrasound transducer pairs, may be envisioned. For example, it is also possible to provide three ultrasound measurement paths, each having two ultrasound transducers, the ultrasound transducers respectively being disposed by 60° along the circumference of the housing.

The ultrasound transducers may be fitted onto the housing of the ultrasound transducer in a straightforward way, for example by using a holding device. Mounting holes are preferably provided in the housing of the ultrasound transducer for the mounting of the ultrasound transducers. The ultrasound transducers may conveniently be fastened inside the mounting holes by using a clamp or screw connections. The connection in this case is, for example, produced in a leak-tight fashion by O-rings, thread seals or the like.

Furthermore, the ultrasound transducers, or the housings of the ultrasound transducers, may be almost flush with the geometry of the housing of the ultrasonic fluid meter after mounting has been carried out. This prevents critical cavities, which may lead to air bubble accumulation, from being formed inside the ultrasonic fluid meter. A negative modification of the measurement result due to turbulences or air bubbles can therefore be prevented.

As an alternative or in addition, the ultrasound transducers may be provided with guide plates, which follow on from the geometry of the housing in such a way that the diameter of the cross-sectional area of the housing always remains constant, in order to prevent turbulences or air bubble formation.

Expediently, at least one diffractive acoustic plate for splitting the ultrasound signals inside the housing may be provided, in order to enlarge the measurement region inside the cross section of the housing even more, and therefore increase the measurement accuracy further.

Preferably, the electronic module is used for recording, storing and processing the measurement values of the ultrasound measurement paths, or of the ultrasound transducers. The measurement values of the ultrasound transducers in this case are transmitted through terminals to the electronic module and processed further.

Expediently, the ultrasonic fluid meter may be configured as a bulk water meter with a rated diameter of at least 50 mm, in particular at least 100 mm, in particular at least 150 mm, preferably at least 200 mm and particularly preferably at least 250 mm.

It may be advantageous to configure the ultrasound measurement paths with different lengths. In this way, the hydraulic dynamic range and the measurement accuracy can be improved particularly at low flow rates, since a larger fluid volume is measured and noise components which are present have a smaller effect on the measurement result.

The present invention furthermore relates to a method for measuring the flow rate and/or volume of a flowing medium. In this case, the ultrasound signals are emitted and received alternately by at least one ultrasound transducer along a first ultrasound measurement path, and emitted and received alternately by at least one ultrasound transducer along a second ultrasound measurement path. In this case, for example, it is possible to use two ultrasound transducers per measurement path or alternatively one ultrasound transducer with an associated mirror, or reflector. The ultrasound signals in this case travel along the first ultrasound measurement path in the flow direction and counter to the flow direction of the medium. Furthermore, the second ultrasound measurement path is also travelled along by ultrasound signals in the flow direction and counter to the flow direction of the medium. In this case, the times of flight and the time-of-flight differences of the ultrasound signals of the first ultrasound measurement path and of the second ultrasound measurement path are respectively determined, the first ultrasound measurement path and the second ultrasound measurement path, respectively as seen in the projection plane of the flow cross section, being disposed so as to extend at an angle to one another and to intersect in a common region.

Advantageously, an average value may be formed with the aid of the times of flight and/or the time-of-flight differences of the first ultrasound measurement path and the second ultrasound measurement path. This average value may subsequently be used for determining the flow rate and/or volume of the flowing medium. The measurement accuracy is additionally increased by this averaging, since measurement inaccuracies of one ultrasound measurement path are reduced by the averaging with a second ultrasound measurement path. Furthermore, even flow profile shifts can be recorded.

Expediently, the ultrasound signals may be emitted in the first and second ultrasound measurement paths in such a way that they do not pass through the common region simultaneously. Crosstalk of the ultrasound signals can therefore be prevented.

Furthermore, the measurement values of the ultrasound measurement paths may be delivered to a common electronic measurement-value recording and evaluation unit. Through the use of an electronic module, measurement errors and/or calculation errors can be successfully avoided, and costs can be reduced.

Preferably, the ultrasound signals of the ultrasound measurement paths may be recorded in double transit. In this way, a plurality of ultrasound signals may also be respectively transmitted successively in alternation from a first to a second ultrasound transducer of an ultrasound transducer pair. Average values may subsequently likewise be derived from these ultrasound signals. The measurement accuracy is improved even further by this feature. Furthermore, a combination of single and double transit of the ultrasound signals may be provided.

Expediently, center-weighted measurement of the flow profile may be achieved by the configuration of the ultrasound measurement paths. This leads to the advantage that even relatively large flow profile shifts have only a moderate effect on the averaged measurement result.

Linearization of the measurement results over the entire measurement region is preferably provided. Due to this linearization, the measurement/evaluation can be achieved by using an intrinsic characteristic curve for all the ultrasound measurement paths, or for the entire flow cross section. Weighting of the individual ultrasound signals, or of the ultrasound measurement paths, is unnecessary. In this way, the calculation inside the electronic module can be simplified, so that measurement errors can be successfully avoided. Furthermore, the production and maintenance costs are reduced by the simplified programming and the simplified structure of the electronic module.

Expediently, the cross section of the housing may also be formed, or configured, in such a way that the proportion of the flow regions not directly recorded by the ultrasound measurement paths is reduced. This leads to the advantage that an even greater proportion of the flow can be covered by the two ultrasound measurement paths. The sensitivity in relation to perturbed flow profiles can thus be reduced further, and the so-called measurement effect (efficiency) improved further.

Furthermore, an additional operational quantity may be recorded for the time-of-flight determination, or for the determination of flow rate and/or volume. The operational quantity may, for example, be recorded by using additional sensors, prefabricated flowcharts in the region of the electronic module, or parts of the ultrasonic fluid meter, for example the ultrasound transducers. Through the use of the electronic module, this quantity may be incorporated into the time-of-flight and/or flow rate calculation. The time of flight, the flow rate and/or the volume can be determined even more exactly in this way.

Expediently, the additional operational quantity may be the temperature of the medium, since measurement inaccuracies occur because of the dependency of the flow rate and temperature of the medium. The measurement accuracy can be increased even further in this way.

Other features which are considered as characteristic for the invention are set forth in the appended claims.

Although the invention is illustrated and described herein as embodied in an ultrasonic fluid meter and a method for determining the flow rate and/or volume of a flowing medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
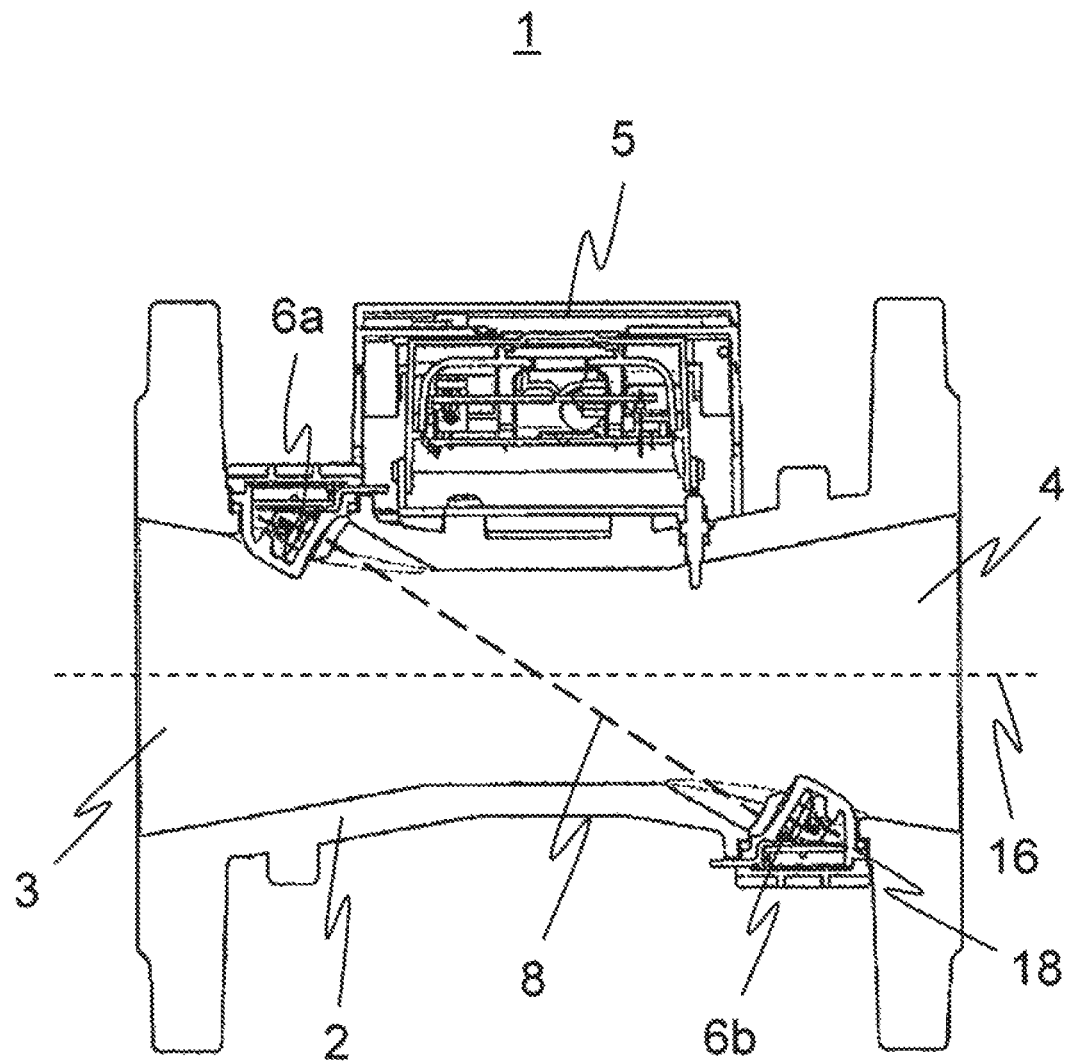
FIG. 1 is a simplified, diagrammatic, partial cross-sectional view of an ultrasonic fluid meter according to the prior art.

Referring now to the figures of the drawings in detail and first, particularly, to FIG. 1 thereof, there is seen a partial cross-sectional representation of an expedient configuration of an ultrasonic fluid meter 1 according to the prior art having ultrasound measurement paths 8 disposed diagonally. The ultrasonic fluid meter 1 includes a housing 2 (for example a connection housing) for installation of the ultrasonic fluid meter 1 inside a fluid line system (not show in FIG. 1), for example a drinking water line.

The housing 2 includes an inlet 3 and an outlet 4. The flow direction of the fluid in this case is from the inlet 3 to the outlet 4. Inside the housing 2, there is an ultrasound transducer pair, which includes two ultrasound transducers 6a, 6b. The ultrasound transducers 6a, 6b are respectively fitted in an ultrasound transducer housing 18. The ultrasound measurement path 8 for time-of-flight determination is disposed between the two ultrasound transducers 6a, 6b. The configuration of the two ultrasound transducers 6a, 6b on the upper and lower inner walls of the housing 2 leads to a diagonally oriented ultrasound measurement path 8 between the two ultrasound transducers 6a, 6b. The ultrasound measurement path 8 in this case intersects the mid-axis 16, or the longitudinal axis, of the housing 2 of the ultrasonic fluid meter 1. The mid-axis 16 in this case generally extends parallel to the flow direction of the medium from the inlet 3 to the outlet 4.

Since the interior of the housing is constructed symmetrically in the flow direction, the ultrasonic fluid meter may in principle also measure with the same accuracy in both directions, i.e. if the electronics so allow, so-called backward flow measurement could also readily be carried out within the standardized error limits.

In order to determine the flow rate and/or volume, ultrasound signals, so-called ultrasound bursts 17a, 17b, are emitted alternately by the ultrasound transducer 6a over the ultrasound measurement path 8 to the ultrasound transducer 6b, and by the ultrasound transducer 6b over the ultrasound measurement path 8 to the ultrasound transducer 6a. Due to the flow, the ultrasound signals which are emitted along the ultrasound measurement path 8 in the flow direction of the medium traverse the ultrasound measurement path 8 more rapidly than the ultrasound signals which are emitted along the ultrasound measurement path 8 counter to the flow direction of the medium. Accordingly, a time-of-flight difference of the ultrasound signals can be determined from these different times of flight of the first and second ultrasound signals. The processing and calculation of the signals and times of flight are carried out by using an electronic module 5. The electronic module 5 may then jointly use the time-of-flight difference for the overall time-of-flight calculation, or the determination of flow rate and/or volume of the flowing medium.

Expediently, the overall time-of-flight calculation may also be carried out on the basis of averaging of a plurality of ultrasound measurement paths, in order to increase the measurement accuracy further. This is achieved by installing a plurality of ultrasound transducer pairs inside an ultrasonic fluid meter. The ultrasound transducer pairs, or the ultrasound measurement paths, are in this case generally disposed in parallel with one another.

Figure 3:
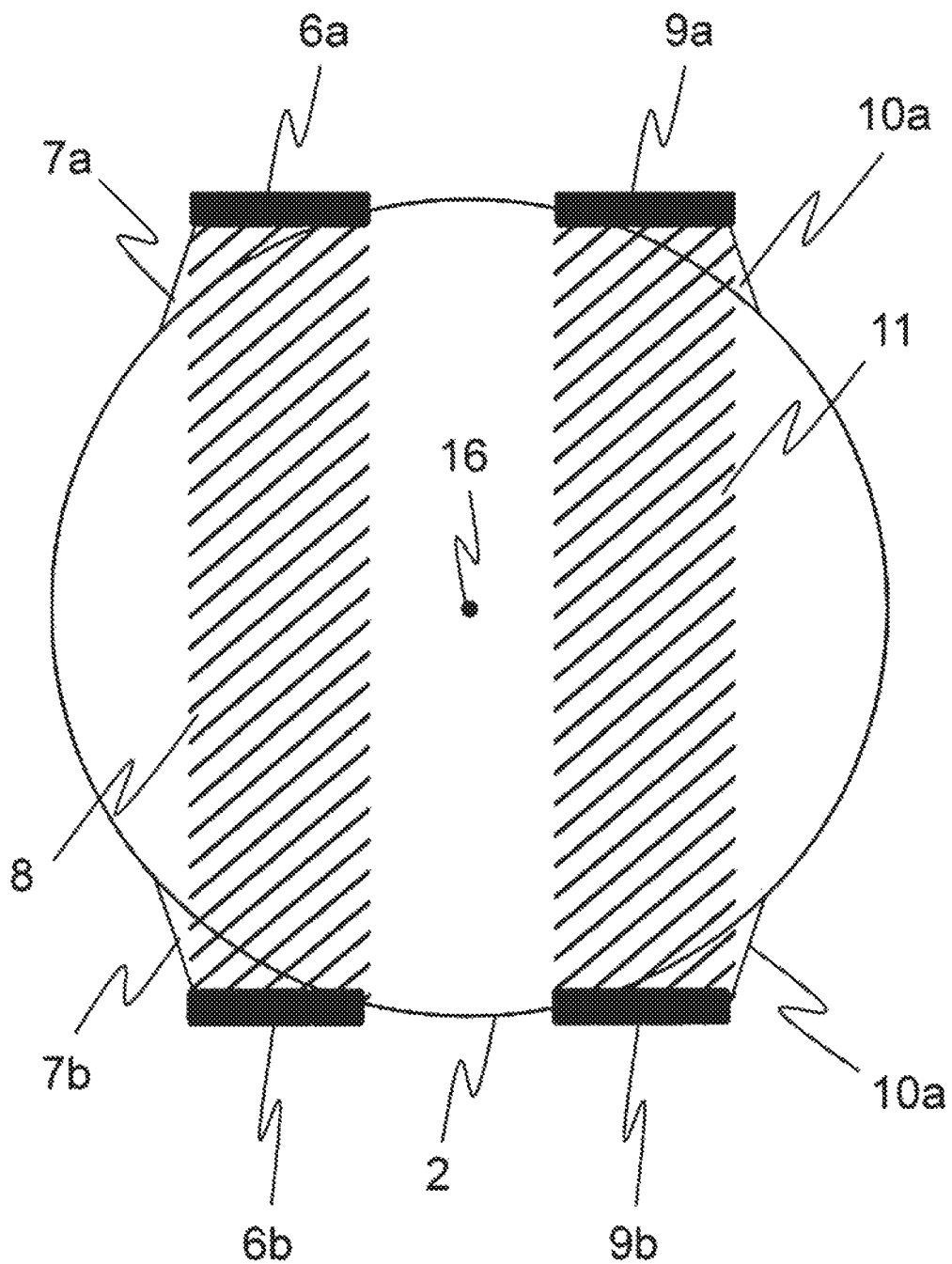
FIG. 3 is a simplified, cross-sectional view in the flow direction of an ultrasonic fluid meter having ultrasound measurement paths disposed in parallel, according to the prior art, as seen in the projection plane of the flow cross section.

FIG. 3 shows a cross-sectional representation of a housing 2 of an ultrasonic fluid meter 1, as seen in the projection plane of the flow cross section or in a viewing direction along the longitudinal or mid-axis 16, with two ultrasound measurement paths 8, 11 disposed parallel to one another, according to the prior art. FIG. 3 illustrates the problems of the conventional parallel configuration of two ultrasound measurement paths 8, 11, for example non-measurement of the generally maximal flow rates at the center of the flow, or of the housing 2. Depending on the flow profile symmetry, the two ultrasound measurement paths 8, 11 may detect extremely large flow profile differences, so that the averaging becomes more inaccurate. In particular, a change between laminar and turbulent flow can only be detected with insufficient accuracy by such a configuration. Furthermore, acoustic crosstalk of the ultrasound signals of the two ultrasound measurement paths 8, 11 may occur with the parallel configuration of the ultrasound measurement paths 8, 11, so that on one hand the reception amplitude is cut down, and on the other hand a resulting phase shift of the added individual signals may cause measurement errors in the time-of-flight difference. Furthermore, there is a structural disadvantage of the ultrasound transducer positioning inside the flow, since lateral pockets or recesses 7a, 7b, 10a, 10b are provided in this case for fitting the ultrasound transducers 6a, 6b, 9a, 9b. This may lead to the formation of dead or turbulent zones in the wake of the ultrasound transducers 6a, 6b, 9a, 9b. Likewise, the configuration of the ultrasound transducers 6a, 6b, 9a, 9b inside the pockets that are formed may promote an air bubble problem and/or sound reflections at the metallic pocket wall.

Furthermore, because of the parallel configuration of the ultrasound measurement paths 8, 11, side sound lobes specific to the ultrasound transducer in the regions of the ultrasound measurement paths 8, 11 which are close to the wall may lead to undesired reflections at the wall of the housing 2. If those sound components reach the receiving ultrasound transducer with a time delay because of the longer time of flight, measurement errors due to formation of interference may occur.

A considerable disadvantage in relation to contamination of the ultrasound transducers can likewise be seen from FIG. 3. Since an introduction of contamination may generally accumulate at the bottom inside the housing 2 of the ultrasonic fluid meter 1, failure of the ultrasound transducers 6a, 6b, 9a, 9b at the bottom, and therefore failure of the entire ultrasound measurement paths 8, 11, and therefore of the ultrasonic fluid meter 1, may occur.

Figure 5:
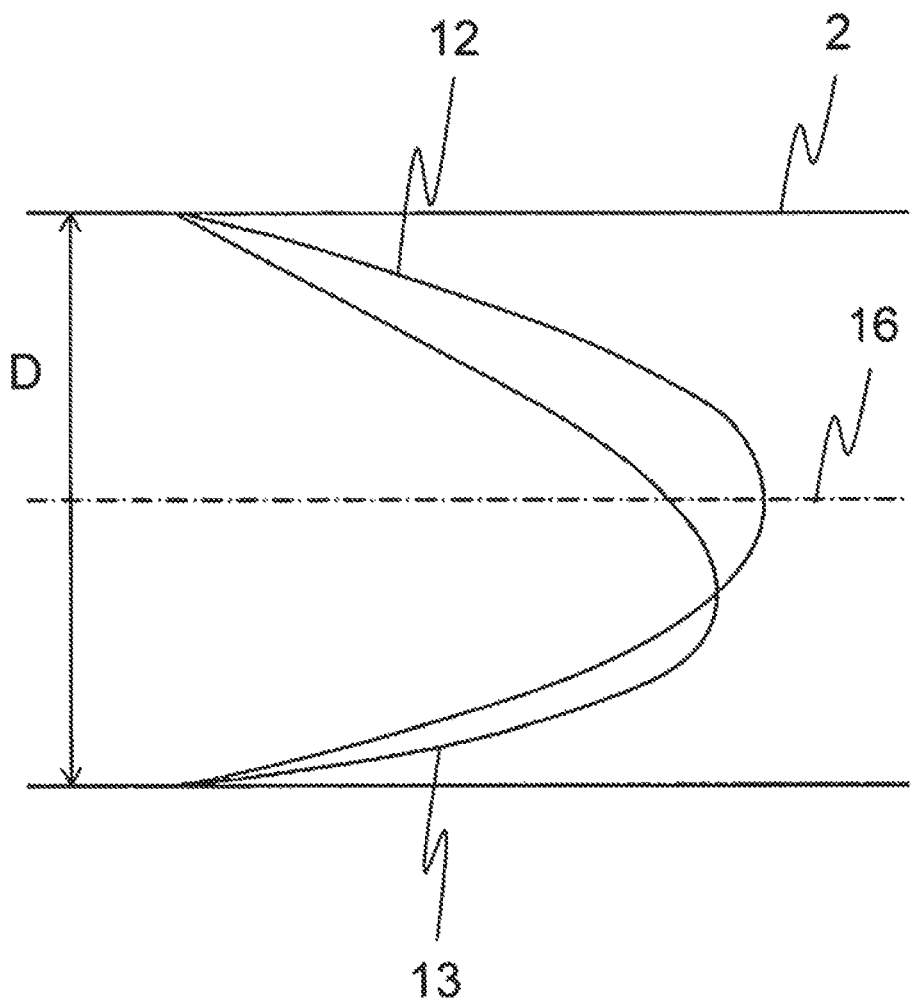
FIG. 5 is a simplified view of a laminar flow profile inside an ultrasonic fluid meter in the perturbed and unperturbed form.

FIG. 5 shows a flow profile prevailing in the case of laminar flow inside the housing 2 of the ultrasonic fluid meter 1. An unperturbed laminar flow profile 12 in this case exhibits a symmetrical distribution over an entire diameter D of the cross section of the housing 2, with the flow rate of the fluid being greatest in the middle of the housing 2 and decreasing toward the wall of the housing 2. A perturbed laminar flow profile 13, on the other hand, shows that the maximum of the flow rate is shifted from the middle of the housing 2 in the direction of the wall of the housing 2. Such perturbed flow profiles may, for example, be caused by air bubbles occurring or irregularities on the housing wall. Furthermore, perturbed flow profiles are also predominantly produced before the ultrasonic fluid meter in the adjoining fluid line network, for example by fixtures such as ball valves, valves, orifices or different tube geometries such as elbows or deviations. Likewise, FIG. 6 shows a prevailing unperturbed turbulent flow profile 14 and a perturbed turbulent flow profile 15.

Figure 6:
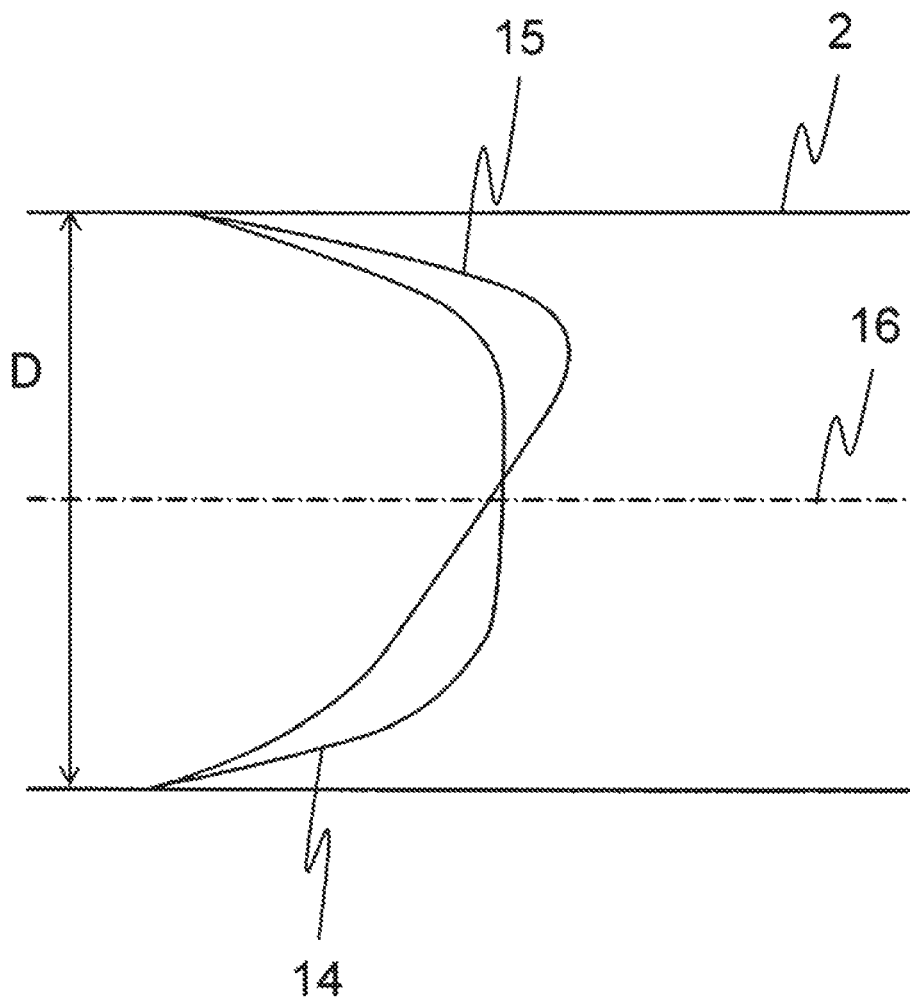
FIG. 6 is a simplified view of a turbulent flow profile inside an ultrasonic fluid meter in the perturbed and unperturbed form.

A comparison of the flow profiles in FIGS. 5 and 6 shows that a center-weighted measurement of the flow rate contributes significantly to the measurement accuracy, since the maximum flow rate is generally recorded directly by the measurement path. Likewise, it is found that in the case of perturbed flow profiles, the flow maximum of which does not lie in the central region of the housing cross section, a reliable average value of the flow rate can be measured by center-weighted measurement.

Figure 2:
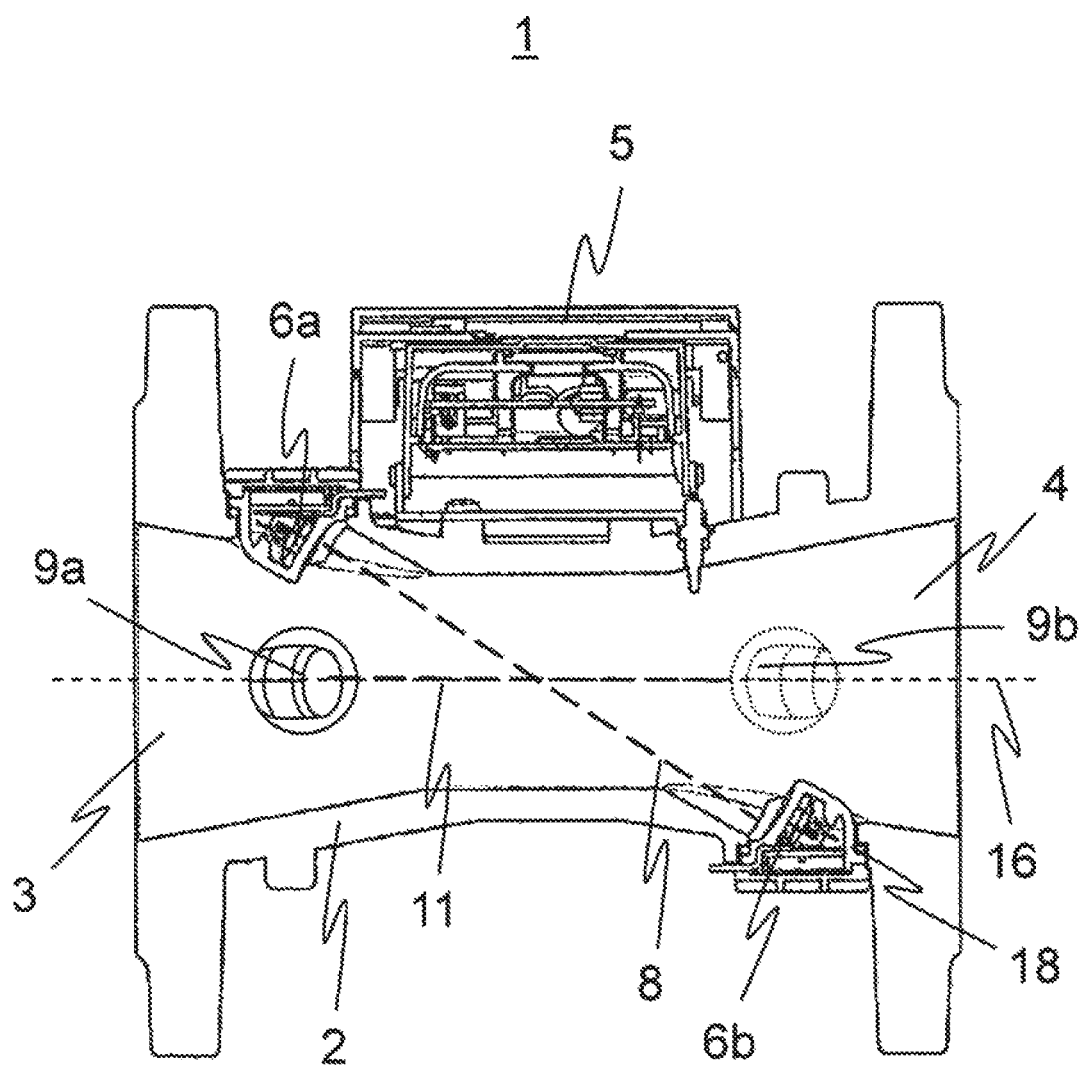
FIG. 2 is a simplified, partial cross-sectional view of an ultrasonic fluid meter according to the invention.

FIG. 2 shows one expedient configuration of the ultrasonic fluid meter 1 according to the invention. As will be explained below, the problems described above which occur according to the configuration in FIG. 3 can be resolved successfully according to the invention, so that the measurement accuracy of the ultrasonic fluid meter 1 is improved significantly. In contrast to the ultrasonic fluid meter 1 according to FIG. 1, the ultrasonic fluid meter 1 according to FIG. 2 has an additional second ultrasound measurement path 11 inside the housing 2, with an associated ultrasound transducer pair 9a, 9b. In this way, the determination of flow rate and/or volume of the flowing medium is improved significantly.

The second ultrasound measurement path 11 in this case is located between the two ultrasound transducers 9a, 9b. Since the ultrasound transducers 9a, 9b are located on the left and right inner walls of the housing 2 of the ultrasonic fluid meter 1, the ultrasound measurement path 11, like the ultrasound measurement path 8, is disposed diagonally between the associated ultrasound transducers 9a, 9b inside the housing 2. The two ultrasound measurement paths 8, 11 in this case are disposed at an angle relative to one another and at an angle relative to the mid-axis 16, and intersect in the region of the mid-axis 16.

Figure 4:
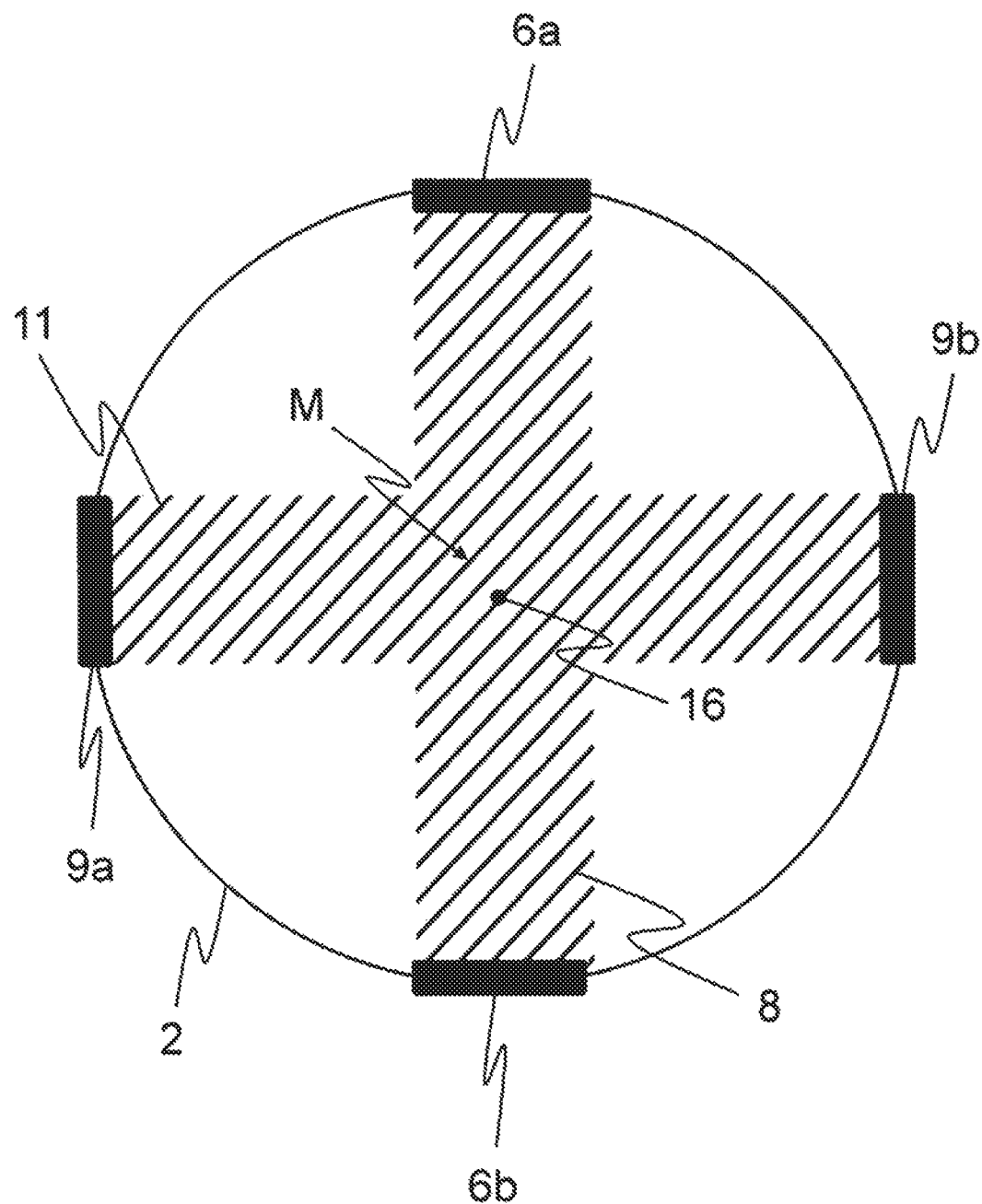
FIG. 4 is a simplified, cross-sectional view in the flow direction of an ultrasonic fluid meter according to the invention having ultrasound measurement paths disposed orthogonal to one another, as seen in the projection plane of the flow cross section.

FIG. 4 shows a representation of a housing cross section of an ultrasonic fluid meter 1 according to the invention as seen in the projection plane of the flow cross section, or in a viewing direction along the longitudinal or mid-axis 16, in the flow direction of the medium. In this projection plane, the ultrasound measurement paths 8, 11 are at a right angle to one another and intersect in a common region M, which at the same time marks the middle of the cross section of the housing 2. The ultrasound transducers 6a, 6b, 9a, 9b are conveniently disposed offset by 90° on the circumference of the housing 2 of the ultrasonic fluid meter 1. As a result of this type of configuration, acoustic crosstalk of the ultrasound signals of the two measurement paths 8, 11 can be minimized, or eliminated, so that the measurement accuracy is increased significantly, in particular even in the case of perturbed flow profiles. Due to this acoustically and hydraulically optimized configuration of the two ultrasound measurement paths 8, 11, more accurate averaging of the times of flight can be carried out.

Advantageously, the ultrasound transducers 6a, 6b, 9a, 9b (herein represented in a simplified fashion) follow on substantially from the geometry of the housing 2. In this way, the formation of critical cavities and gas bubble accumulation in the region of the ultrasound transducers 6a, 6b, 9a, 9b can be avoided. In order to reinforce this effect, guide plates or guide surfaces (not represented in FIG. 4) may furthermore be provided in the region of the ultrasound transducers 6a, 6b, 9a, 9b. These plates or surfaces are then inserted into the housing 2 in such a way that the cross-sectional area of the housing 2 always remains constant.

The four ultrasound transducers 6a, 6b, 9a, 9b in this case form two ultrasound measurement paths 8, 11 diagonally opposite one another in the flow direction of the medium, which can act independently of one another. The middle of the housing cross section, as well as four edge regions, therefore lie inside the ultrasound measurement paths 8, 11, so that optimal measurement of all important flow regions is ensured. Perturbed and unperturbed flow profiles in the case of laminar and turbulent flows can therefore be recorded optimally.

The electronic module 5 calculates an average value which is used for the determination of flow rate and/or volume from the values of the ultrasound measurement paths 8, 11 in a straightforward way. The recording of the values of the independent ultrasound measurement paths 8, 11 may in this case be carried out either simultaneously or successively. The measurement accuracy and measurement stability are therefore improved significantly, particularly in the case of the intersection of the two ultrasound measurement paths 8, 11 at 90° as represented herein.

Figure 7:
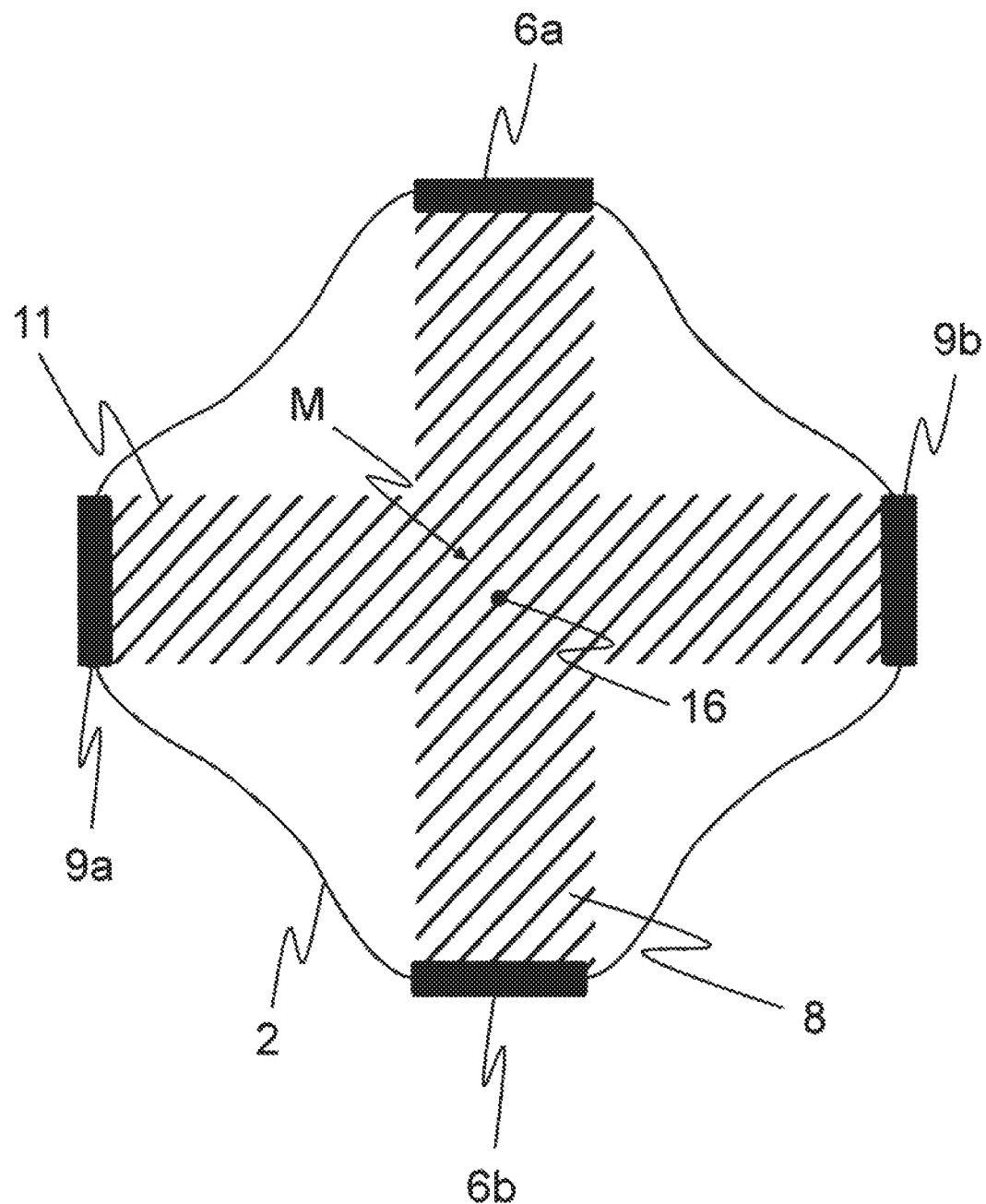
FIG. 7 is a simplified, cross-sectional view in the flow direction of an ultrasonic fluid meter according to the invention having ultrasound measurement paths disposed orthogonal to one another and an alternative configuration of the housing with a reduced cross-sectional area, as seen in the projection plane of the flow cross section.

According to an alternative configuration of the ultrasonic fluid meter shown in FIG. 7, the housing 2 may also be configured in such a way that the cross section of the housing 2 is reduced so that the proportion of the flow regions not recorded by the ultrasound measurement paths 8, 11 is reduced. Advantageously, the flow proportion which is covered by the two ultrasound measurement paths 8, 11 is therefore increased, and the measurement accuracy is therefore improved.

Figure 8:
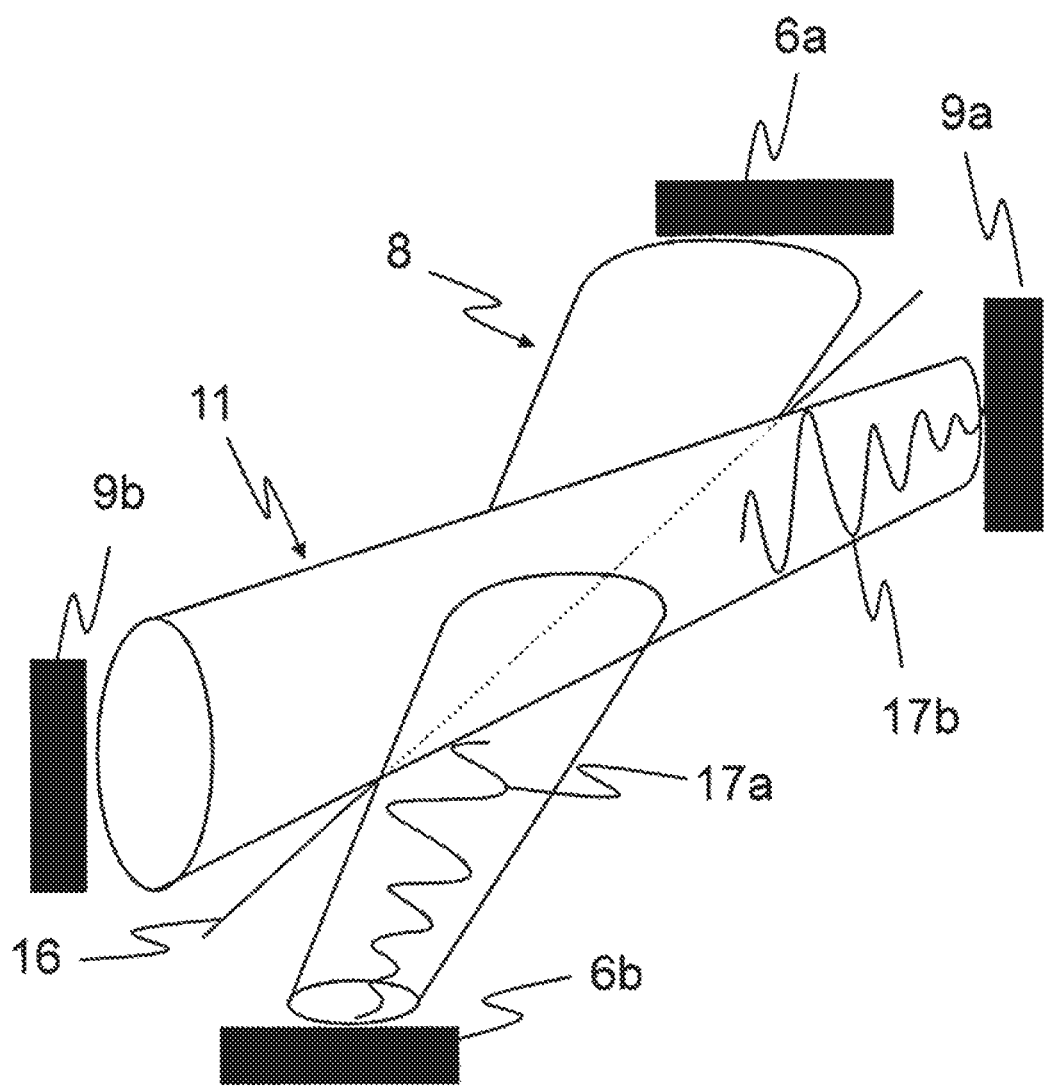
FIG. 8 is a highly simplified, perspective view of an ultrasound measurement path configuration inside an ultrasonic fluid meter according to the invention.

FIG. 8 shows a perspective representation of an ultrasound transducer configuration having four ultrasound transducers 6a, 6b, 9a, 9b and two ultrasound measurement paths 8, 11. The ultrasound transducers in this case emit ultrasound signals, or ultrasound bursts 17a, 17b, along the ultrasound measurement paths 8, 11. The first ultrasound measurement path 8 and the second ultrasound measurement path 11 are disposed so as to extend at an angle relative to one another and to intersect in the region of the mid-axis 16, or in the region of the longitudinal axis of the housing 2. The first ultrasound measurement path 8 and the second ultrasound measurement path 11 are disposed so as to extend obliquely, or diagonally, with respect to the mid-axis 16 of the housing 2.

Figure 9:
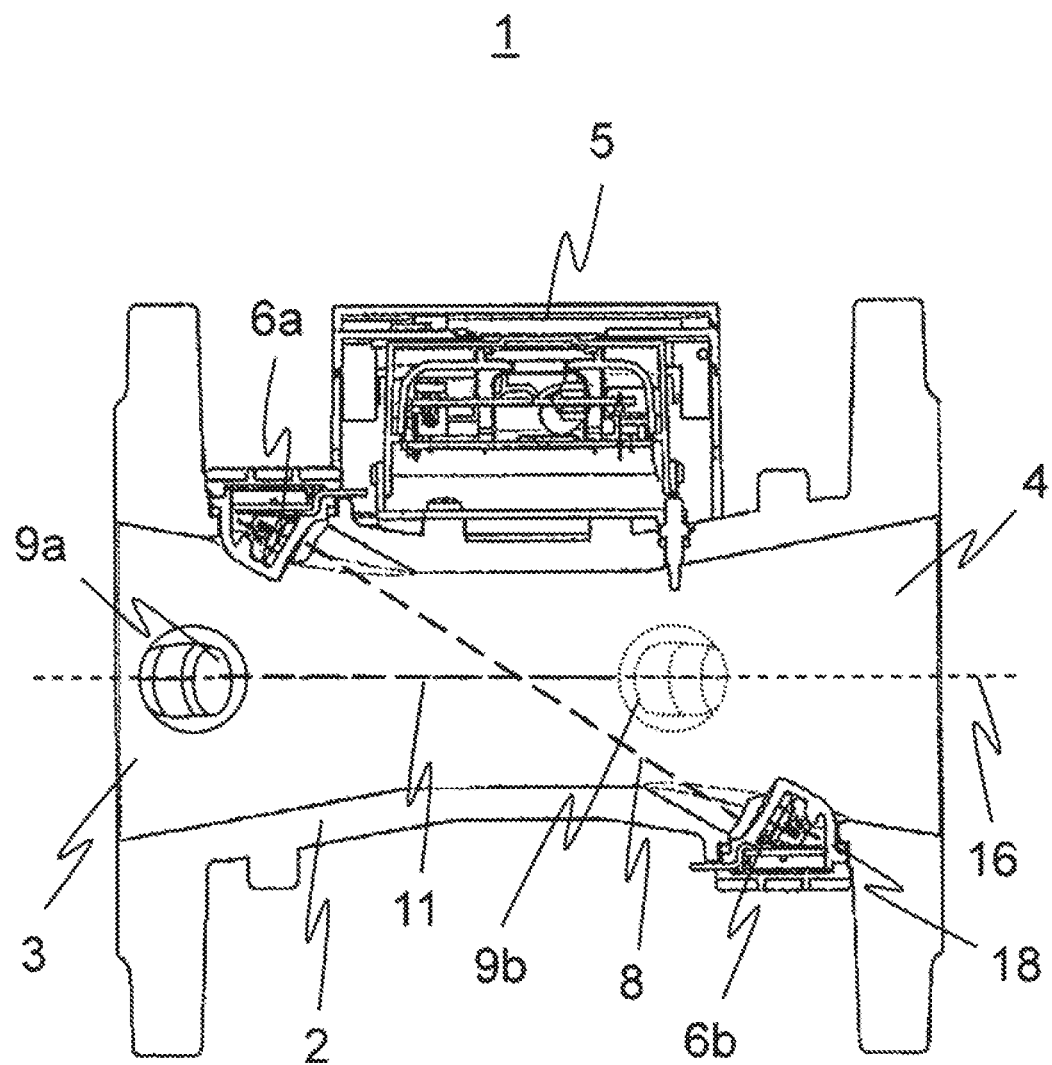
FIG. 9 is a simplified, partial cross-sectional view of the ultrasonic fluid meter according to the invention with a skew configuration of the ultrasound measurement paths.
Figure 10:
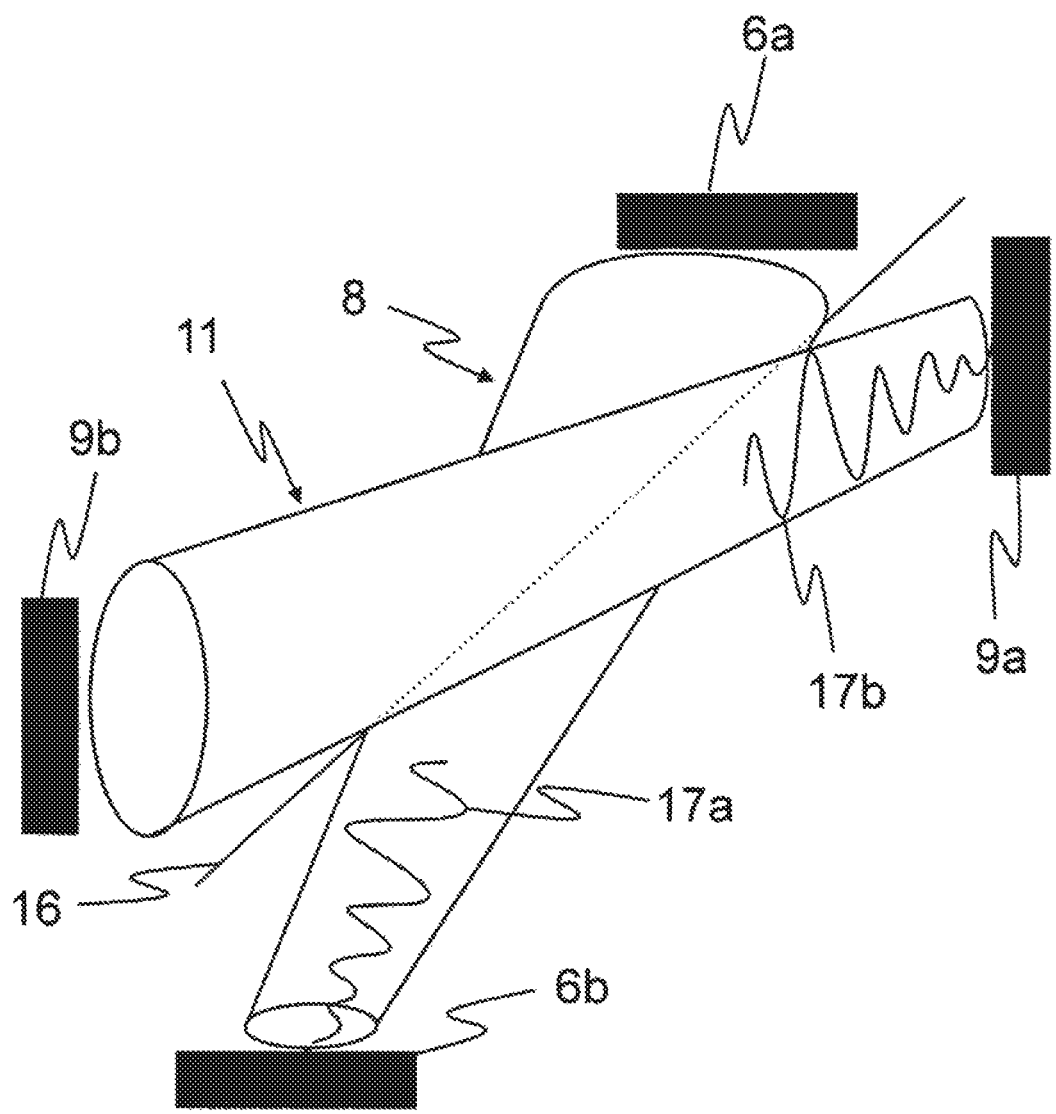
FIG. 10 is a highly simplified, perspective view of an ultrasound measurement path configuration inside an ultrasonic fluid meter according to the invention with an oblique configuration of the ultrasound measurement paths.

FIG. 9 shows an alternative configuration of the ultrasonic fluid meter 1 according to the invention with a skew configuration of the ultrasound measurement paths 8, 11. The ultrasound transducers 6a, 9a and 6b, 9b in this case are additionally disposed offset along the longitudinal axis of the housing 2. As is seen in the projection plane of the flow cross section, the angled configuration of the ultrasound measurement paths 8, 11 according to FIG. 4 remains unchanged, i.e. in this case the ultrasound measurement paths 8, 11 intersect in a common region M, although the ultrasound measurement paths 8, 11 are disposed skewed with respect to one another and, as represented in FIG. 10, do not actually intersect. Due to this possibility of a skew configuration of the ultrasound measurement paths 8, 11 inside the ultrasonic fluid meter 1, the positioning of the ultrasound transducers 6a, 6b, 9a, 9b can be adapted individually to the housing geometry.

Figure 11:
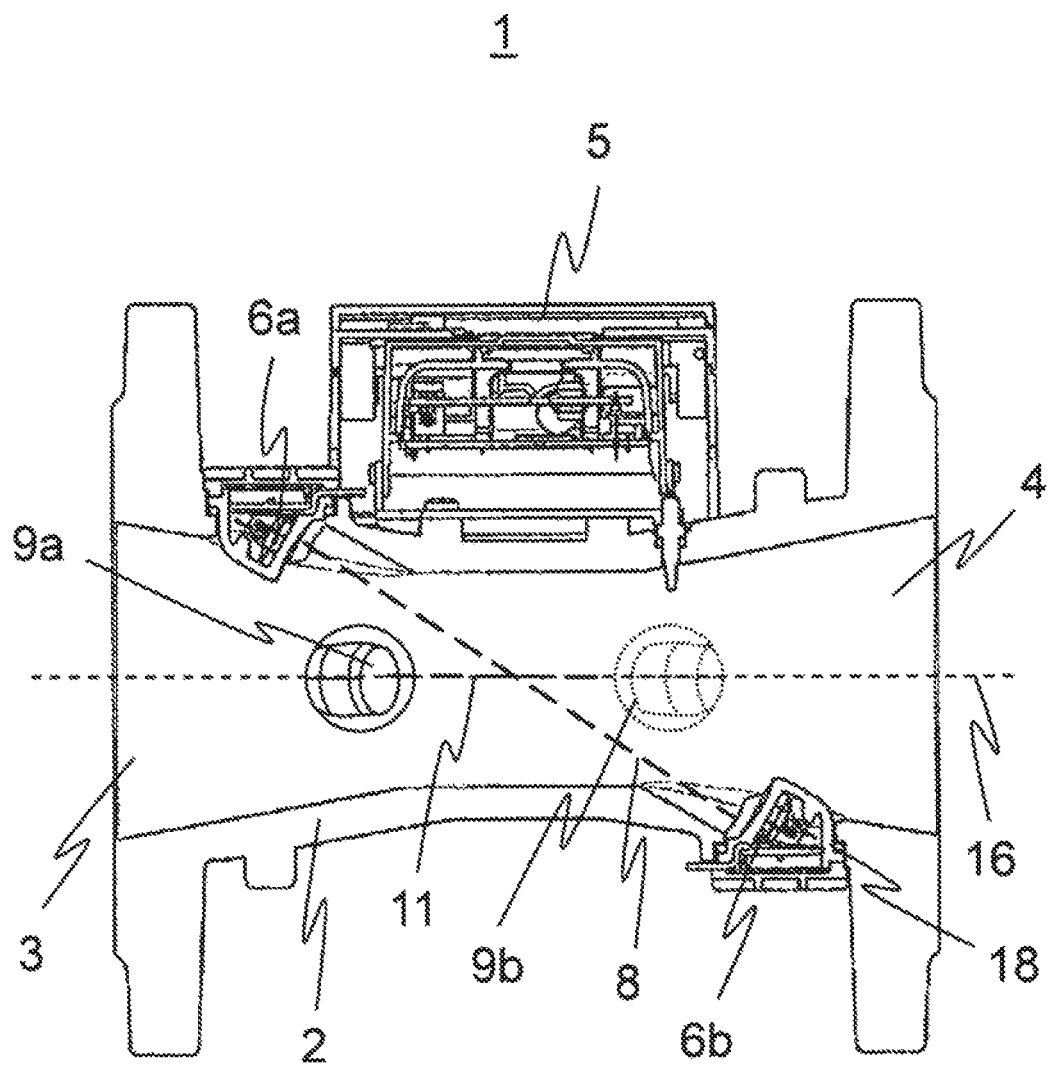
FIG. 11 is a simplified, partial cross-sectional view of the ultrasonic fluid meter according to the invention with ultrasound measurement paths of different length.

A further expedient configuration is obtained by the fact that the ultrasonic fluid meter 1, according to FIG. 11, has ultrasound measurement paths 8, 11 configured with different lengths. The time-of-flight difference is thereby reduced, and therefore so is the measurement effect compared with the originally longer ultrasound measurement path 11. However, the frequency of the ultrasound signal often limits the maximum electronic measurement dynamic range, since for example certain time-of-flight difference measurement principles allow a time difference measurement only in the region of one period of a measurement burst. The use of two differently long ultrasound measurement paths 8, 11 therefore makes it possible to increase the hydraulic dynamic range despite the restricted electronic dynamic range of the arithmetic unit. However, the ultrasound measurement paths 8, 11 need to be linearized separately from one another by using characteristic curves. For example, the sound transmission angle is increased by shortening the ultrasound measurement path 11. Shortening of an ultrasound measurement path 11 may, for example, be carried out by having one or both of the ultrasound transducers 9a, 9b protrude further into the interior of the housing 2.

Figure 12:
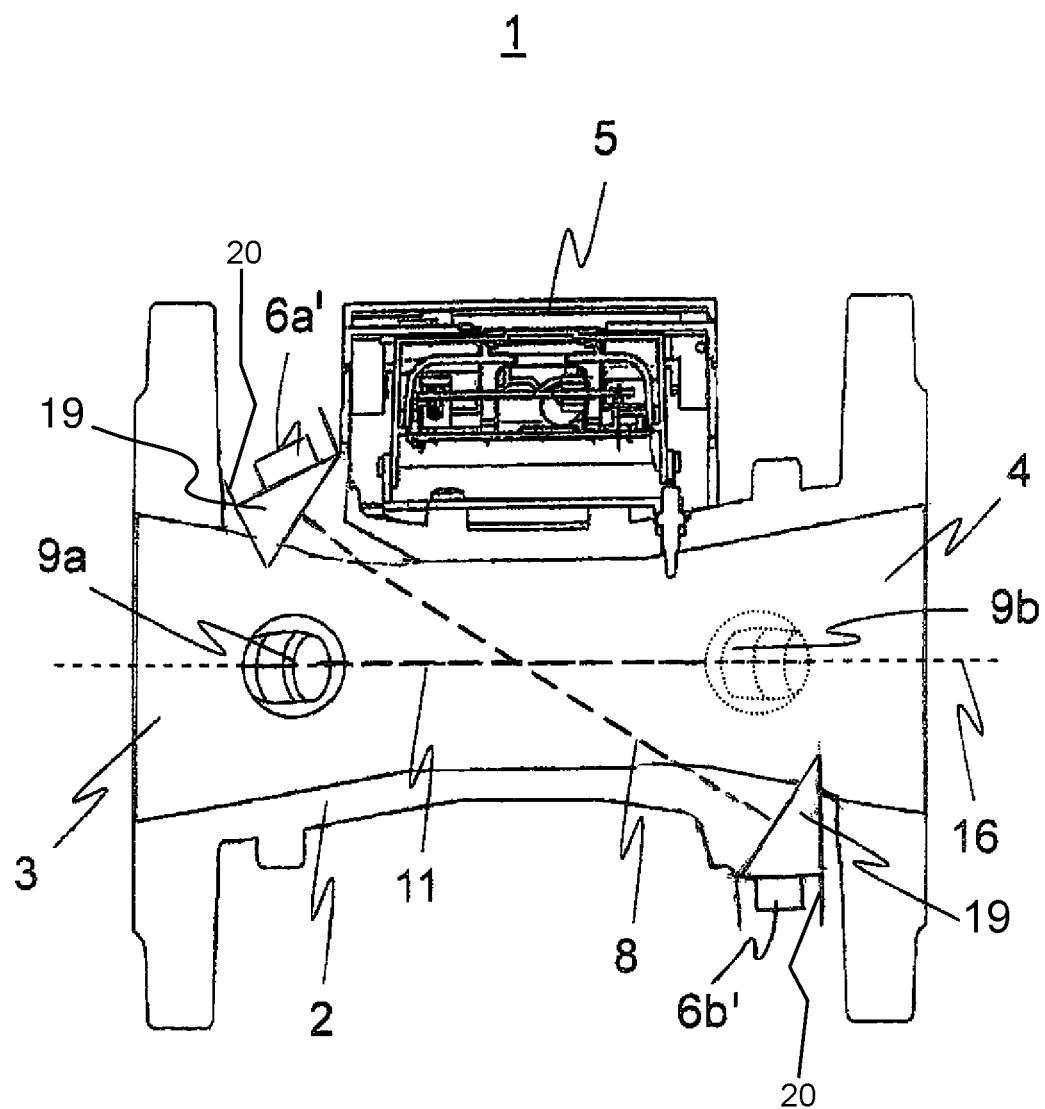
FIG. 12 is a view similar to FIG. 2, which includes two diffractive acoustic plates.

FIG. 12 shows the ultrasonic fluid meter 1 of FIG. 2 having two diffractive acoustic plates 19 for splitting ultrasound signals. The diffractive acoustic plates 19 are disposed adjacent respective piezo elements 6a' and 6b' and disposed within respective housings 20.

Figure 13:
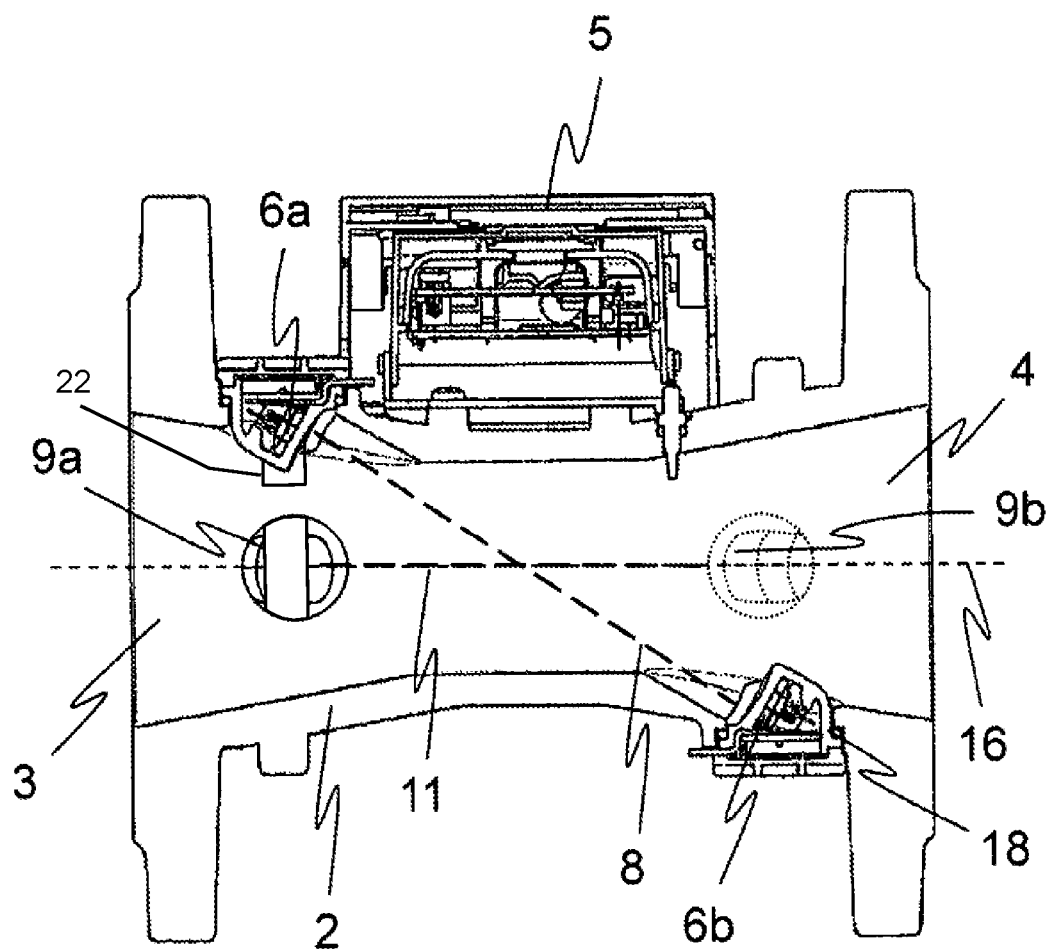
FIGS. 13 and 14 are views similar to FIG. 2 respectively including an elongated flat guide plate and a cylindrical guide plate.
Figure 14:
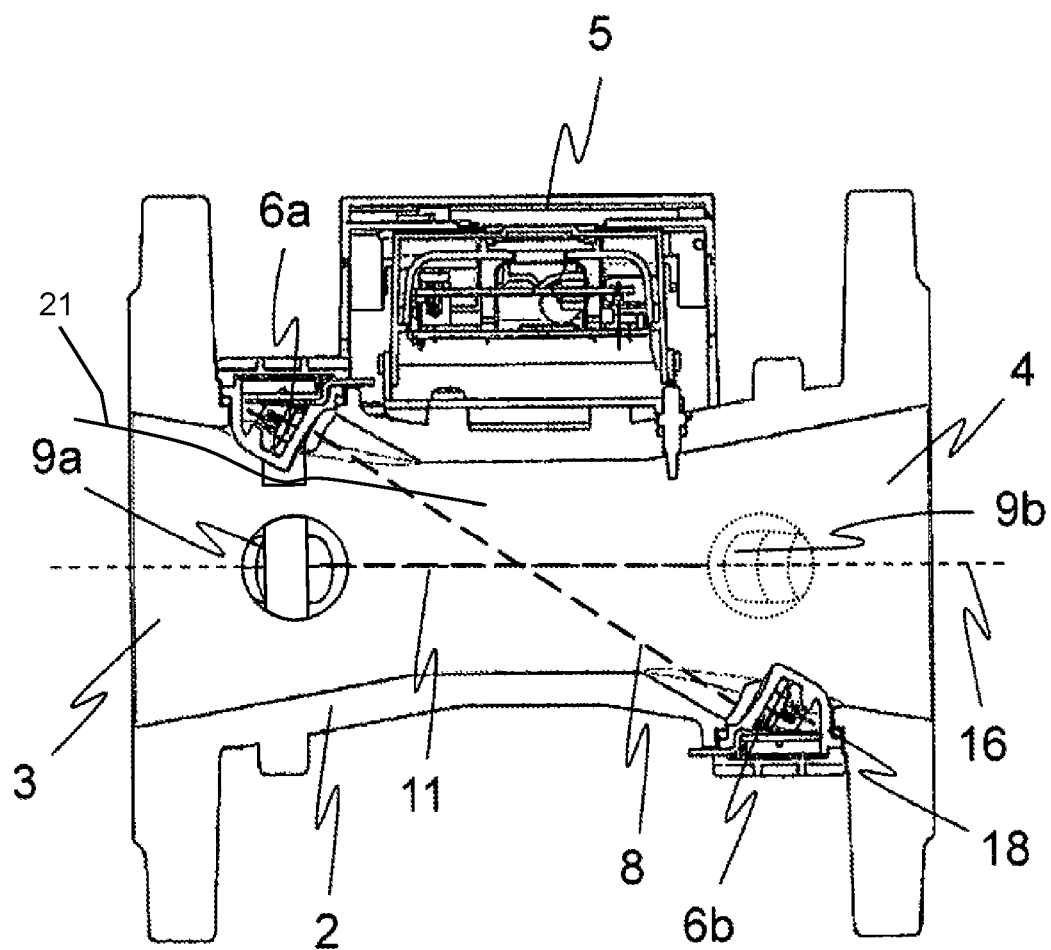

FIGS. 13 and 14 show the ultrasonic fluid meter 1 of FIG. 2 having guide plates in the vicinity of the ultrasound transducers 6a, 6b. An elongated flat guide plate 21 is shown in FIG. 14 and a cylindrical guide plate 22 is shown in FIG. 13.

As an alternative or in addition, a temperature sensor (not represented) for temperature recording may be provided. This temperature value may be delivered to the electronic module 5 and incorporated as a so-called correction quantity into the time-of-flight calculation. Furthermore, the ultrasound transducers 6a, 6b, 9a, 9b themselves may also be used for temperature determination.

Furthermore, other operational quantities of the ultrasound transducers 6a, 6b, 9a, 9b, for example the resonant behavior, current, voltage, impedance, capacitance, or values derivable therefrom, may be recorded and used for the time-of-flight calculation.

In comparison with the configuration according to the prior art of FIG. 3, the configuration according to the invention in FIG. 4 presents an additional advantage in relation to contamination of the housing 2 of the ultrasonic fluid meter 1. Since the introduction of contamination generally sediments at the bottom of the housing 2, only the lower ultrasound transducer 6b of the ultrasound measurement path 8 is compromised. In the event of failure of the ultrasound transducer 6b, and therefore of the ultrasound measurement path 8, a flow rate measurement can still be carried out by using the ultrasound measurement path 11, since the two ultrasound transducers 9a, 9b of the ultrasound measurement path 11 are located approximately half-way up the housing 2. Failure of the ultrasound measurement path 11 due to introduction of contamination is therefore unlikely.

The following is a summary list of reference numerals and the corresponding structure used in the above description of the invention:

1 ultrasonic fluid meter
2 housing
3 inlet
4 outlet
5 electronic module
6a ultrasound transducer
6b ultrasound transducer
6a' piezo element
6b' piezo element
7a recess
7b recess
8 ultrasound measurement path
9a ultrasound transducer
9b ultrasound transducer
10a recess
10b recess
11 ultrasound measurement path
12 laminar flow profile, unperturbed
13 laminar flow profile, perturbed
14 turbulent flow profile, unperturbed
15 turbulent flow profile, perturbed
16 mid-axis
17a ultrasound burst
17b ultrasound burst
18 ultrasound transducer housing 19 diffractive acoustic plates
20 housings
21 elongated flat guide plate
22 cylindrical guide plate
D diameter of the cross section of the housing
M common region

The invention claimed is:

1. An ultrasonic fluid meter for determining at least one of a flow rate or a volume of a flowing medium, the ultrasonic fluid meter comprising:
    a connection housing for installation of the ultrasonic fluid meter inside a fluid line system, said connection housing having an inlet, an outlet and a flow cross section with a projection plane;
    a first ultrasound measurement path including a first and a second ultrasound transducer;
    a second ultrasound measurement path including a first and a second ultrasound transducer;
    said first and second ultrasound measurement paths extending at an angle relative to one another inside said connection housing and intersecting one another in a common region in the projection plane of the flow cross section;
    said housing having a mid-axis, and said first ultrasound measurement path and said second ultrasound measurement path extending obliquely relative to said mid-axis;
    said first and second ultrasound measurement paths defining a center-weighted measurement within said connection housing; and
    an ultrasonic module configured for:
        determining time-of-flight differences of ultrasound signals in said first ultrasound measurement path and said second ultrasound measurement path,
        forming an average value by using the time-of-flight differences of said first ultrasound measurement path and said second ultrasound measurement path; and
        using the average value for determining at least one of the flow rate or the volume of the flowing medium.

2. The ultrasonic fluid meter according to claim 1, wherein said first and second ultrasound measurement paths extend at an angle relative to one another in a projection plane lying transversely relative to said mid-axis.

3. The ultrasonic fluid meter according to claim 2, wherein said first and second ultrasound measurement paths extend at a right angle relative to one another.

4. The ultrasonic fluid meter according to claim 1, which further comprises guide plates disposed in a vicinity of said ultrasound transducers.

5. The ultrasonic fluid meter according to claim 1, which further comprises a diffractive acoustic plate disposed in a vicinity of said ultrasound measurement paths for splitting ultrasound signals.

6. The ultrasonic fluid meter according to claim 1, wherein said electronic module is configured for recording, storing and processing measurement values of said ultrasound measurement paths.

7. The ultrasonic fluid meter according to claim 1, wherein said flow cross section of said housing is configured to reduce a proportion of regions not directly recorded by said ultrasound measurement paths.

8. The ultrasonic fluid meter according to claim 1, wherein said ultrasound measurement paths have different lengths.

9. A method for determining at least one of a flow rate or a volume of a flowing medium in an ultrasonic fluid meter having a connection housing for installation of the ultrasonic fluid meter inside a fluid line system, the method comprising the following steps:
    using a first and a second ultrasound transducer to alternately emit and receive ultrasound signals along a first ultrasound measurement path;
    using a first and a second ultrasound transducer to alternately emit and receive ultrasound signals along a second ultrasound measurement path;
    guiding the ultrasound signals along the first ultrasound measurement path in a flow direction and counter to the flow direction of the medium;
    guiding the ultrasound signals along the second ultrasound measurement path in the flow direction and counter to the flow direction of the medium;
    determining time-of-flight differences of the ultrasound signals in the first ultrasound measurement path and the second ultrasound measurement path;
    positioning the first ultrasound measurement path and the second ultrasound measurement path to extend at an angle relative to one another and to intersect one another in a common region in a projection plane of a flow cross section of the medium;
    using the first and second ultrasound measurement paths to perform a center-weighted measurement within the connection housing for installation of the ultrasonic fluid meter inside the fluid line system;
    forming an average value by using the time-of-flight differences of the first ultrasound measurement path and the second ultrasound measurement path; and
    using the average value for determining at least one of the flow rate or the volume of the flowing medium.

10. The method according to claim 9, which further comprises emitting the ultrasound signals in the first and second ultrasound measurement paths in such a way as to not pass through the common region simultaneously.

11. The method according to claim 9, which further comprises delivering measurement values of the ultrasound measurement paths to a common electronic measurement-value recording and evaluation unit.

12. The method according to claim 9, which further comprises recording ultrasound signals of the ultrasound measurement paths in at least one of a single or a double transit.

13. The method according to claim 9, which further comprises providing a linearization of measurement results over an entire measurement region.

* * * * *